(No Model.) 3 Sheets—Sheet 2.

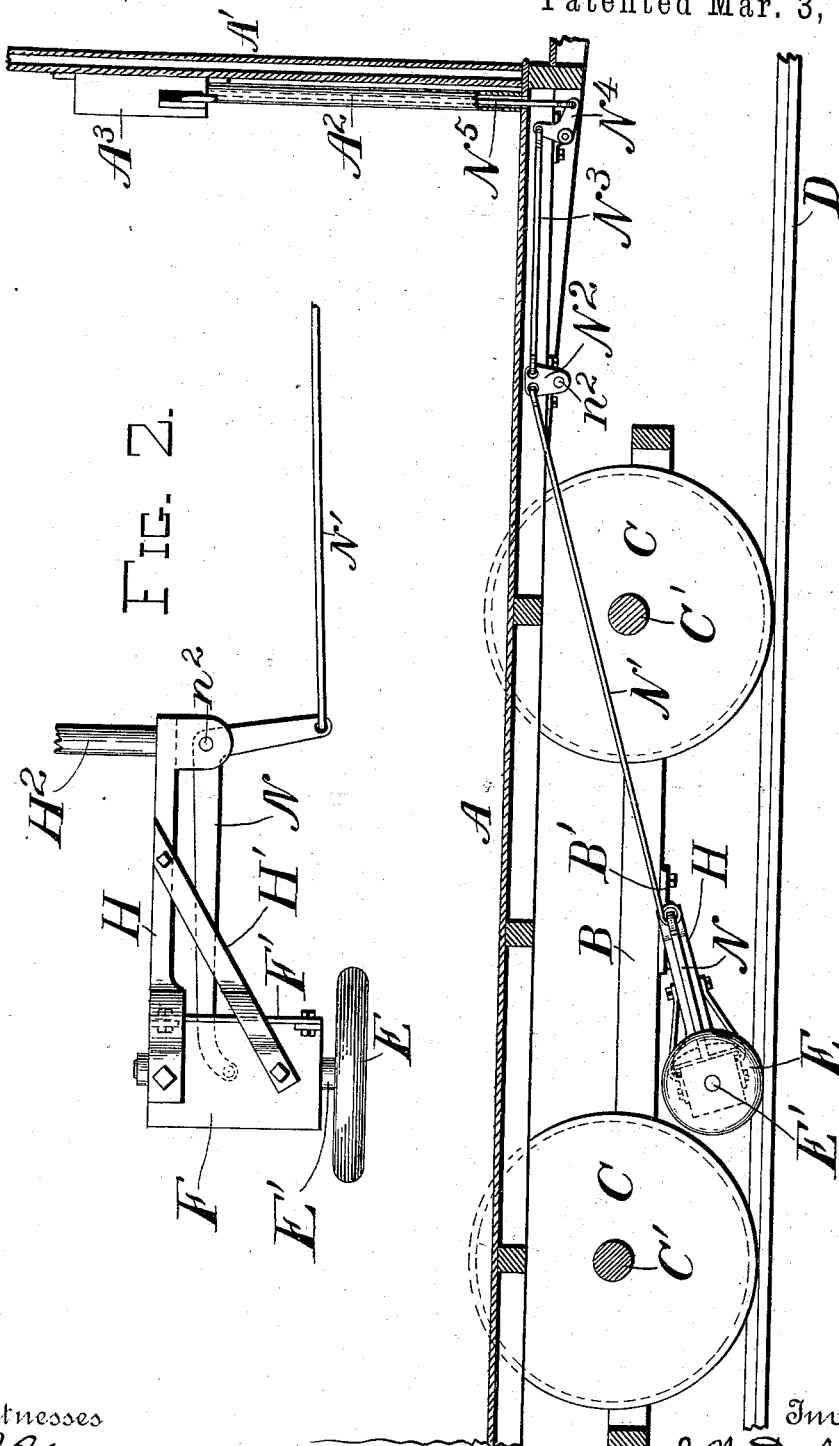

J. W. DARLEY, Jr.
SPEED INDICATING ALARM.

No. 555,853. Patented Mar. 3, 1896.

Witnesses
Inventor
J. W. Darley, Jr.
by Whitman & Wilkinson
Attorneys.

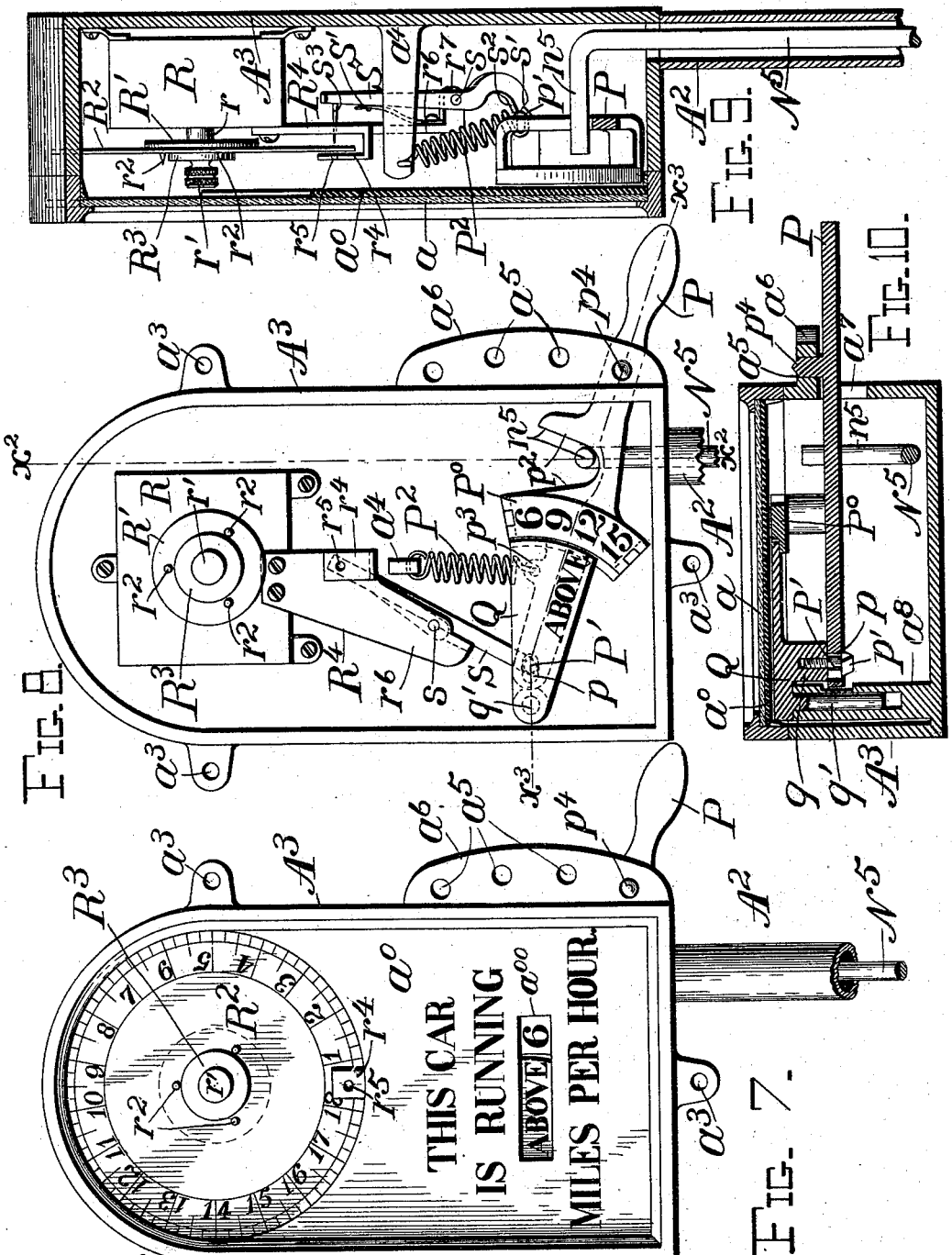

UNITED STATES PATENT OFFICE.

JOHN W. DARLEY, JR., OF BALTIMORE, MARYLAND, ASSIGNOR OF ONE-HALF TO MICHAEL HOLZMAN, PHILIP HAMBURGER, AND LEON HAMBURGER, OF SAME PLACE.

SPEED-INDICATING ALARM.

SPECIFICATION forming part of Letters Patent No. 555,853, dated March 3, 1896.

Application filed May 7, 1894. Serial No. 510,412. (No model.)

*To all whom it may concern:*

Be it known that I, JOHN W. DARLEY, Jr., a citizen of the United States, residing at Baltimore city, in the State of Maryland, have invented certain new and useful Improvements in Speed-Signaling Apparatus for Use on Railway-Cars; and I do hereby declare the following to be a full, clear, and exact description of the invention, such as will enable others skilled in the art to which it appertains to make and use the same.

My invention relates to improvements in apparatus for signaling the speed of wheeled vehicles of any description, and is applicable to railway-cars, road-wagons, or any other vehicles where it is desired to signal the fact that the speed of the vehicle has reached or exceeded any given rate.

The invention is especially intended to be applied on street-railway cars which travel through cities or thickly-inhabited districts, and where the car is prohibited from exceeding a given speed, or where the speed on various parts of the route is limited by law or by city ordinance.

The invention consists essentially of the combination of an auxiliary shaft carried by the vehicle and caused to revolve at a velocity proportional to that of the vehicle, a gong mounted on or in juxtaposition to said shaft, and a hammer caused by said shaft to strike said gong when the speed of the vehicle exceeds the rate for which the apparatus is set. In addition to the gong a speed-indicator of any well-known construction may also be operated by the auxiliary shaft. In lieu of an auxiliary wheel the signal apparatus may be operated by one of the wheels of a car; but since these wheels are apt to slip on the track I prefer, ordinarily, to use an independent wheel.

My invention will be better understood after referring to the accompanying drawings, in which the same parts are indicated by the same letters throughout the several views.

While the term "car" will be used throughout in describing the drawings, it will be evident that most of the herein-described apparatus would be adapted for use with any other form of vehicle.

Figure 5:
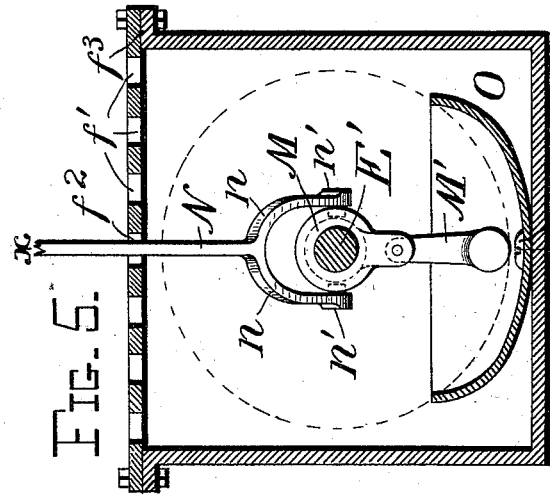
Figure 6:
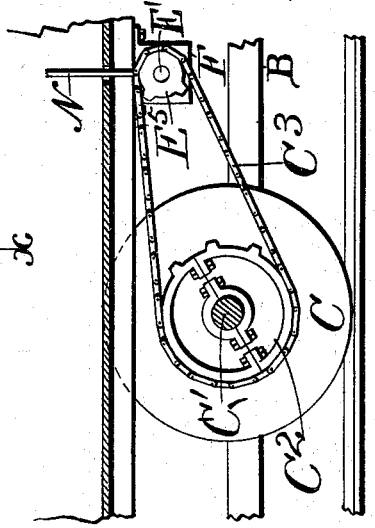
Figure 3:
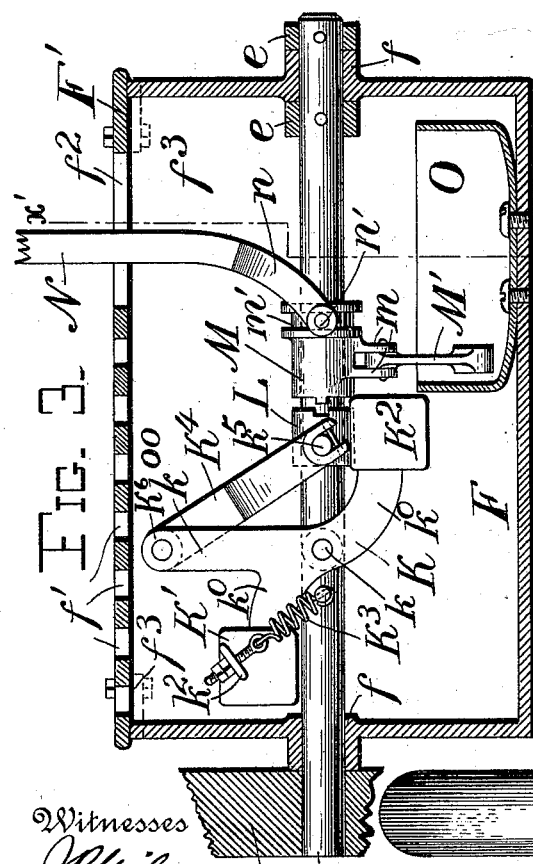
Figure 4:
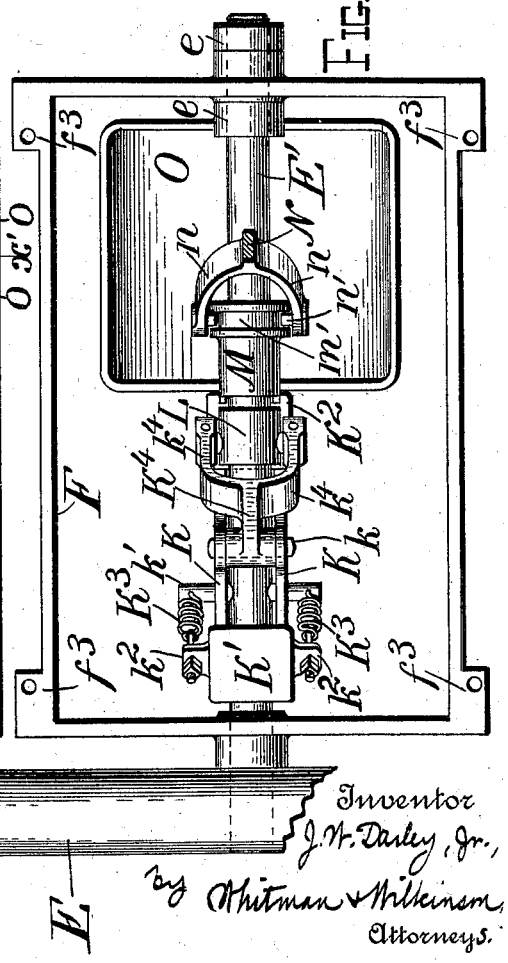

Figure 1 represents a sectional view of a portion of a car fitted with an auxiliary wheel, a gong, and an indicator for signaling the speed of the car. Fig. 2 represents a plan view of the auxiliary wheel and its immediate attachments, being an enlarged view of a portion of the apparatus shown in Fig. 1. Fig. 3 represents a still further enlarged sectional view of the box mounted on the shaft of the auxiliary wheel and acting as journal-bearings for the same, the said section being along the line $x\ x$ of Fig. 5, and the parts mounted on the shaft being shown in elevation. Fig. 4 represents a view of the interior of the box shown in Fig. 3 after the perforated cover has been removed. Fig. 5 represents a section along the line $x'\ x'$ of Fig. 3 and looking to the left. Fig. 6 represents the speed-signaling apparatus as operated by a sprocket-chain meshing in a sprocket-wheel fast on one of the axles of the car instead of by an independent wheel. Fig. 7 represents a front view of one form of speed-indicator adapted for use in connection with the herein-described apparatus. Fig. 8 represents the interior of the indicator-box shown in Fig. 7 after the face of the indicator has been removed. Fig. 9 represents a section along the line $x^2\ x^2$ of Fig. 8 and looking to the left, and Fig. 10 represents a section along the broken line $x^3\ x^3$ of Fig. 8 and looking down.

In the drawings, A represents the body of the car mounted upon the trucks B, in which the axles C' of the wheels C are journaled. These wheels run upon the tracks D, or, in the case of a wagon, they run upon the ground itself.

E represents the trail-wheel, mounted upon a shaft E', which is journaled in the box F suspended by means of the frame H and brace H' to the shaft $H^2$, which is journaled in the bearings B' beneath the truck B. The shaft E' revolves in the journals $f$ of the box F, and the inner end of the said shaft is held against longitudinal motion by the set-collars $e$.

The top of the box F, which box is preferably made of metal, is closed with a plate F', which is grated or slotted, as at $f'$, to allow the free passage of the air-vibrations therethrough, and is also slotted, as at $f^2$, to allow the lever N to have a longitudinal play therein.

The upper portion of the box F is provided with lugs or flanges $f^3$, perforated as shown in Fig. 4, through which pass the bolts for securing the perforated top or cover on the box.

The speed-governor is pivoted on the shaft E', as at $k$, and has two parallel plates K, with symmetrical arms $k^0$, which terminate in weights K' and K$^2$. The weight K' and the arms supporting the same are normally drawn toward the shaft E' by means of the tension-springs K$^3$, which are connected at one end to the pin $k'$ passing through the shaft and at the other end to the ears $k^2$ projecting from the weight K'. These two bent plates K project upward in arms $k^{00}$, between which the connecting-rod K$^4$ is pivoted, as at $k^6$. The lower end of this connecting-rod K$^4$ is bifurcated, as at $k^4$, and is pivotally connected, as at $k^5$, to the member L of a clutch-coupling, of which the part M forms the other member. This part M is in the form of a loose sleeve mounted on the shaft E' and provided with lugs $m$, between which the upper end of the clapper M' is pivotally secured. The rear end of this sleeve M is provided with an annular groove $m'$, in which engage the rollers $n'$ secured to the arms $n$ at the lower end of the bifurcated lever N.

Since the centrifugal speed-governor and member L of the clutch-coupling revolve with the shaft, while the sleeve M is loosely mounted thereon, it will be evident that whenever the governor is thrown outward a sufficient distance to cause the member L to couple onto the member M, then the said member M will revolve with the member L and the shaft E', causing the clapper M' to strike the gong O, secured, as at $o$, in the box L. It will also be evident that if the springs K$^3$ be set so as to hold the governor against centrifugal force until any given speed is reached, then the gong will not be sounded until that speed is reached. Again, if the sleeve M be moved farther away from the member L of the clutch-coupling, it will be evident that it will take a higher speed to cause the member L to be thrown forward far enough to engage with the sleeve M and thus sound the gong. By a combination of these two adjustments the governor may be held in position until a given speed is reached, and then it may act against the springs K$^3$, causing the member L to reach and engage the sleeve M at such a position as will indicate any predetermined speed.

In the form of device shown in Fig. 6 the shaft E' is revolved by means of the sprocket-wheels C$^2$ and E$^5$ and the sprocket-chain C$^3$, the sprocket-wheel C$^2$ being on the same axle C' with the wheel C of the car and the sprocket-wheel E$^5$ being fast on the shaft E'.

The devices shown in Figs. 7 to 10 are for so adjusting the sleeve M that the member L will engage the same when any desired speed is reached, and also for indicating the speed reached and the time that this occurs. In these figures A$^3$ represents an indicator-box, preferably of cast metal, secured by means of the ears $a^3$ to the front end of the car. This box is preferably shut in by a glass plate $a$, beneath which is a card or board $a^0$, printed with some such expression as "This car is running —— miles per hour." This cardboard is slotted, as at $a^{00}$, to allow the movable part of the signal to be seen therethrough. At one side of the box A$^3$ the flange $a^6$ is provided, having a plurality of pin-holes or indentations $a^5$ arranged in an arc of a circle whose center is that of the pivot $p'$. (Shown in Figs. 8 and 10.) Beneath the box a pipe or casing A$^2$ is provided, through which passes the rod N$^5$, which is bent over at its upper end, as at $n^5$, and is connected at its lower end to the bell-crank lever N$^4$, which latter is connected by means of the rod N$^3$, rocking arm N$^2$, pivoted at $n^2$, and rod N' to the lever N, as shown in Fig. 1. The lever N is of the bell-crank form, and is pivoted, as at $n^2$, to the frame H.

In Figs. 7 to 10, P represents a lever which is pivoted at $p$ to the bolt P', engaging in the stud $q$ of a second lever, Q. This bolt P' is provided with a wedge-shaped head $p'$ for reasons hereinafter to be described. The lever P carries near its center an arc P$^0$, on which the speeds to be noted are marked. Thus in Fig. 8 the speeds to be indicated are six, nine, twelve, and fifteen miles per hour. The upper side of this lever is cut away, as at $p^2$, to receive the bent end $n^5$ of the rod N$^5$. This lever P has a small lateral play to enable the studs $p^4$ to be moved from one to the other of the holes $a^5$ in the rib $a^6$. A tension-spring P$^2$ is secured at one end to a fixed stud $a^4$ and at the other to the lug $p^3$ on the lever P. This spring is inclined forward, as shown in Fig. 9, so that it may tend to hold the stud $p^4$ in whichever one of the holes $a^5$ it may be placed. The numbers on the arc P$^0$ are so arranged that the lowest number will appear through the hole $a^{00}$ in the cardboard face $a^0$ when the lever is in the lowest position, while the highest number will show through the said hole when the lever is in the highest position. Whenever the stud $p^4$ is in any one of the holes $a^5$ the lever P will be in effect pivoted on the stud $p^4$ and the inner end of the said lever will be acted upon by three forces. The weight of the rod N$^5$ and its attachments will tend to drag the inner end of the lever down, as will also the weight of the lever Q, while the upward tension of the spring P$^2$ will counterbalance these two forces and normally hold the lever in the position shown in Fig. 8.

Now if through the action of the centrifugal governor the sleeve M is pushed back on the shaft E', then the rod N$^5$ will be lifted until the bent end $n^5$ is clear of the lever P. The spring P$^2$ will at once draw the inner end of the lever P upward, causing the lever Q to revolve about its pivot $q'$ until the word "above," or some such term, marked on the face of the said lever, is brought in sight in the slot $a^{00}$, as shown in Fig. 7. While the speed of the car exceeds the rate indicated the rod $N^5$ will remain lifted and the lever P will keep the word "above" visible. As soon as the speed falls below the rate indicated the centrifugal governor will uncouple from the sleeve M, and the rod $N^5$ and attachments will drag the inner end of the lever down, causing the word "above" to disappear behind the cardboard below the slot $a^{00}$. It will be evident that the gong O will be sounded simultaneously with the raising of the rod $N^5$, and consequently the speed will be indicated by both a visible and an audible signal.

The apparatus is so far complete and operative in itself; but if it be desired to also indicate the time at which the speed has exceeded certain limits a chronograph may be attached to the apparatus.

One form of chronograph adapted for use in the herein-described apparatus is shown in the upper portions of Figs. 7, 8, and 9. In these figures, R represents a case containing clockwork of any well-known type, and $r$ indicates the spindle carrying the disk $R'$, to which the dial $R^2$ is secured in any convenient way, preferably by means of the points $r^2$ and the clamping-disk $R^3$, held in place by the thumb-screws $r'$. Since cars are ordinarily run only about eighteen hours a day, it might be more convenient to have this disk so regulated as to revolve every eighteen hours, or the normal time in which a car runs, and to set the disk at the initial point when the car begins to run. The disk is preferably made of cardboard, and the same disk may be used over and over again, crossing out the old indications thereon, or a new disk may be put in place as often as desired, preferably every morning.

$R^4$ represents a dependent arm, which is turned up, as at $r^4$, and perforated, as at $r^5$, to admit the pricker $s^3$. A prolongation $r^6$ of this arm $R^4$ carries the spring $S'$, and also a lug $r^7$, to which the lever S is pivoted, as at $s$. The lower edge of this lever slopes, as at $s'$, and is then curved backward, as at $s^2$, while the upper portion of the lever carries the pricker $s^3$. The edge $s'$ of the lever is arranged in the line of travel of the wedge-shaped head $p'$ of the pivot-pin $P'$.

It will be seen that whenever the inner end of the lever P is drawn upward by the spring $P^2$ the head $p'$ of the pin $P'$ will press back the lower end of the lever S, causing the pricker $s^3$ to perforate the dial $R^2$, and that as soon as the pin-head $p'$ passes over the face $s'$ and into the curved portion $s^2$ of the lever S the spring $S'$ will press the pricker back out of the dial, and thus a pin-hole will be made in the dial at the exact moment that the speed exceeds the rate to which it is limited.

As the speed slows down, the lever P in returning to the normal position will once more press back the lower end of the lever and make another pin-hole in the dial $R^2$, and the distance between these pin-holes will indicate the angle through which the dial has moved while the car was running at the prohibited speed, and hence the time during which the car was running too fast.

It will be evident from an inspection of Figs. 1 and 8 that the apparatus may be set to indicate any excess of speed over six, nine, twelve, or fifteen miles per hour, while by increasing the number of figures on the arc $P^0$ and the number of holes $a^5$ in the rib $a^6$, or by increasing the length of the said rib, the apparatus may be made to indicate the fact that the car is running faster than any desired speed.

It will be obvious that many modifications of the herein-described apparatus might be made which could be used without departing from the spirit of my invention.

Having thus described my invention, what I claim, and desire to secure by Letters Patent of the United States, is—

1. The combination with a shaft rotated by the motion of the vehicle, of a centrifugal governor mounted upon said shaft, a clutch-coupling operated by said governor, and a gong, and indicator operated by said clutch-coupling when the speed exceeds a predetermined limit, substantially as described.

2. The combination with a shaft rotated by the motion of the vehicle, of a centrifugal governor mounted upon said shaft, a clutch-coupling operated by said governor, and a gong, indicator and chronograph operated by said clutch-coupling when the speed exceeds a predetermined limit, substantially as described.

3. In combination with a shaft rotated by the motion of the vehicle, of a centrifugal governor mounted upon said shaft, a clutch-coupling having one member connected to said governor and operated thereby, and rotating with the said shaft, and the second member loose on said shaft, a hammer connected to said second member, a gong adapted to be struck by said hammer when said clutch-coupling is in engagement and means for adjusting the normal distance of the second member of said coupling from the first, substantially as described.

4. The combination with an approximately horizontal shaft rotated by the motion of the vehicle, of a centrifugal governor mounted upon said shaft, an adjustable spring connected to one arm of said governor and adapted to regulate the action thereof, a clutch-coupling having one member connected to said governor and operated thereby, and rotating with the said shaft and the second member loose on said shaft, a hammer connected to said second member, and a gong adapted to be struck by said hammer when said clutch-coupling is in engagement, and means for regulating the normal distance of said second member from the first, substantially as described.

5. The combination with a shaft rotated by the motion of the vehicle, of a centrifugal governor mounted upon said shaft, a clutch-coupling operated by said governor and speed-signaling apparatus operated by said clutch-coupling when the speed exceeds a predetermined limit, and means for altering the point of engagement of said clutch-coupling, substantially as described.

6. The combination with a shaft rotated by the motion of the vehicle, of a centrifugal governor mounted upon said shaft, an adjustable spring adapted to regulate the action of said governor, a clutch-coupling having one of its members connected to and operated by said governor, and the second member adapted to be engaged by the first when the speed exceeds a predetermined limit, speed-signaling apparatus operated by said second member, and means for regulating the normal distance of said second member from the first, substantially as described.

7. In an apparatus of the character described, the combination of the rod $N^5$ and means for moving the same when the speed exceeds a predetermined limit, of the lever P normally supporting the end of said rod and means for adjusting the position of said lever, of the arm Q pivoted at $q'$ in the framework and also at $p$ to the lever P, and a spring adapted to raise the free end of said arm when said rod is lifted, substantially as and for the purposes described.

8. In an apparatus of the character described, the combination of the rod $N^5$ and means for moving the same when the speed exceeds a predetermined limit, of the lever P normally supporting the end of said rod and means for adjusting the position of said lever, of the arm Q pivoted at $q'$ in the framework and also at $p$ to the lever P, and a spring adapted to raise the free end of said arm when said rod is lifted, and a chronograph operated by said arm, substantially as and for the purposes described.

In testimony whereof I affix my signature in presence of two witnesses.

JOHN W. DARLEY, JR.

Witnesses:
A. WAGNER,
J. C. WILSON.